US012633540B2

(12) United States Patent
Deng et al.

(10) Patent No.: US 12,633,540 B2
(45) Date of Patent: May 19, 2026

(54) NEGATIVE ELECTRODE ACTIVE MATERIAL AND PREPARATION METHOD THEREOF

(71) Applicant: CONTEMPORARY AMPEREX TECHNOLOGY (HONG KONG) LIMITED, Hong Kong (CN)

(72) Inventors: Baida Deng, Ningde (CN); Meng Kang, Ningde (CN); Chen Zeng, Ningde (CN); Libing He, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 556 days.

(21) Appl. No.: 18/138,742

(22) Filed: Apr. 25, 2023

(65) Prior Publication Data

US 2023/0268505 A1      Aug. 24, 2023

Related U.S. Application Data

(63) Continuation of application No. PCT/CN2022/070617, filed on Jan. 7, 2022.

(51) Int. Cl.
| | |
|---|---|
| *H01M 4/583* | (2010.01) |
| *C01B 32/20* | (2017.01) |
| *C01B 32/21* | (2017.01) |
| *C01B 32/23* | (2017.01) |
| *H01M 4/36* | (2006.01) |
| *H01M 4/587* | (2010.01) |
| *H01M 4/02* | (2006.01) |

(52) U.S. Cl.
CPC ............. *H01M 4/583* (2013.01); *C01B 32/20* (2017.08); *C01B 32/21* (2017.08); *C01B 32/23* (2017.08); *H01M 4/364* (2013.01); *H01M 4/587* (2013.01); *H01M 2004/027* (2013.01)

(58) Field of Classification Search
None
See application file for complete search history.

(56) References Cited

U.S. PATENT DOCUMENTS

2018/0040875 A1      2/2018  Kim et al.

FOREIGN PATENT DOCUMENTS

| | | |
|---|---|---|
| CN | 107408698 A | 11/2017 |
| CN | 108886137 A | 11/2018 |
| CN | 111146417 A | 5/2020 |

(Continued)

OTHER PUBLICATIONS

Machine translation of CN 113363446, Sep. 2021.*

(Continued)

*Primary Examiner* — Jonathan Crepeau
(74) *Attorney, Agent, or Firm* — XSENSUS LLP

(57) ABSTRACT

This application provides a negative electrode active material and a preparation method thereof. The negative electrode active material may be self-embedded graphite composed of graphite A and graphite B, where the surface of the graphite A may have a tenon structure, the surface of the graphite B may have a mortise structure, the tenon structure of the graphite A and the mortise structure of the graphite B may be mutually embedded, and a hydrogen bond may be formed between the tenon structure of the graphite A and the mortise structure of the graphite B.

20 Claims, 3 Drawing Sheets

(56)                    References Cited

FOREIGN PATENT DOCUMENTS

| | | | |
|---|---|---|---|
| CN | 111403705 | A | 7/2020 |
| CN | 107408698 | B | 12/2020 |
| CN | 113363446 | A | 9/2021 |
| CN | 113646927 | A | 11/2021 |
| EP | 3893297 | A1 | 10/2021 |
| JP | 2013-030355 | A | 2/2013 |
| WO | 2021239063 | A1 | 12/2021 |

OTHER PUBLICATIONS

International Search Report issued Sep. 20, 2022 in International Patent Application No. PCT/CN2022/070617 with English translation.

Shim, Jae-hyun et al., "Characterization of graphite etched with potassium hydroxide and its application in fast-rechargeable lithium ion batteries", Journal of Power Sources 324 (2016), pp. 475-483, May 31, 2016.

Wu, Yan et al., "Enhancing the Li—ion storage performance of graphite anode material modified by LiAIO2", Electrochimica Acta 235 (2017), pp. 463-470, Mar. 19, 2017.

Extended European Search Report issued May 31, 2024 in European Patent Application No. 22879625.6.

* cited by examiner

NEGATIVE ELECTRODE ACTIVE MATERIAL AND PREPARATION METHOD THEREOF

CROSS-REFERENCE TO RELATED APPLICATION

The present application is a continuation of International Application No. PCT/CN2022/070617, filed Jan. 7, 2022, which is incorporated herein by reference in its entirety.

TECHNICAL FIELD

This application relates to the battery field, and in particular, to a negative electrode active material and a preparation method thereof.

BACKGROUND

With advantages such as high energy density, long cycle life, safety, and reliability, secondary batteries have been widely used in various digital products, portable devices, electric vehicles, energy storage power supplies, and the like. In recent years, with the need for secondary batteries as power sources increasing significantly, higher requirements are imposed on performance of the secondary batteries, such as kinetic performance and storage performance.

SUMMARY

In view of the foregoing problems, this application is intended to provide a negative electrode active material, which can implement high adhesion force using a small amount of binder during electrode preparation, so as to obtain a secondary battery having excellent kinetic performance, storage performance, and cycling performance.

A first aspect of this application provides a negative electrode active material, where the negative electrode active material is self-embedded graphite composed of graphite A and graphite B; the surface of the graphite A has a tenon structure, and the surface of the graphite B has a mortise structure; and the tenon structure of the graphite A and the mortise structure of the graphite B are mutually embedded, and a hydrogen bond is formed between the tenon structure of the graphite A and the mortise structure of the graphite B.

In this way, particles of the negative electrode active material of this application are embedded with each other through a physical mortise-tenon connection and a chemical hydrogen bond, thereby reducing a use amount of a binder and improving kinetic performance and storage performance of a battery.

In any embodiment, the tenon structure of the graphite A is formed by an oxygen-containing metal salt, and a contact angle between the graphite A and a blank electrolyte is less than or equal to 20°. Preferably, the oxygen-containing metal salt is an oxygen-containing lithium metal salt or an oxygen-containing sodium metal salt, and more preferably is selected from at least one of lithium metaaluminate, lithium metazincate, sodium metaaluminate, and sodium metazincate. The surface of the mortise structure of the graphite B has a hydroxyl group, and a contact angle between the graphite B and the blank electrolyte is less than or equal to 15°. The blank electrolyte is formed by dissolving lithium hexafluorophosphate at a concentration of 1 mol/L in a solvent that is formed by mixing ethylene carbonate and dimethyl carbonate at a mass ratio of 1:1.

The surface of the graphite A has a protrusion (as the tenon structure) formed of the oxygen-containing metal salt, and the surface of the mortise structure of the graphite B is provided with the hydroxyl group, so that the protrusion and the hydroxyl group can be combined together through physical embedding and chemical hydrogen bond bonding, thereby improving the kinetic performance of the battery.

In any embodiment, a contact angle between the self-embedded graphite and the blank electrolyte is less than or equal to 15°, and the blank electrolyte is formed by dissolving lithium hexafluorophosphate at the concentration of 1 mol/L in the solvent that is formed by mixing ethylene carbonate and dimethyl carbonate at the mass ratio of 1:1.

The contact angle being controlled within the above specific ranges can improve surface infiltration of the self-embedded graphite, facilitating slurry dispersion and electrolyte infiltration retention.

A second aspect of this application provides a preparation method of negative electrode active material, including the following steps:

(1) adding a first graphite matrix into a polar solvent, then adding a raw material for preparing the oxygen-containing metal salt by making an amount of the oxygen-containing metal salt coating the surface of the first graphite matrix be 1-5 wt % of the weight of the first graphite matrix, followed by stirring, evaporation and drying, and then calcining the resulting mixture in a nitrogen atmosphere at a temperature of 500-1200° C. for 8-24 hours to obtain graphite A having a tenon structure;

(2) adding a second graphite matrix into an alkaline solution having a pH greater than or equal to 13, stirring at a constant temperature of 60-100° C. for 8-36 hours, and after filtering, cleaning and drying the resulting product to obtain graphite B having a mortise structure; and (3) mixing the graphite A and the graphite B to obtain a negative electrode active material.

Based on the foregoing method, the negative electrode active material of the first aspect of this application can be prepared.

In any embodiment, preferably, the first graphite matrix and the second graphite matrix are the same or different from each other. Preferably, the first graphite matrix and the second graphite matrix are the same or different artificial graphite.

In any embodiment, preferably, the raw material for preparing the oxygen-containing metal salt includes:

(1) any one of lithium nitrate, sodium nitrate, and potassium nitrate; and (2) at least one of aluminum nitrate, zinc nitrate, and ferric nitrate.

In any embodiment, preferably, $D_v50$ of the first graphite matrix and the second graphite matrix each satisfy the following condition: $3.0\,\mu m \leq D_v50 \leq 15.0\,\mu m$, and optionally, $5.0\,\mu m \leq D_v50 \leq 13.5\,\mu m$. The $D_v50$ of the graphite matrix being controlled within the above specific ranges can shorten solid-phase diffusion distance of lithium ions, thereby improving the kinetic performance of the battery and properly taking into account the storage performance of the battery.

In any embodiment, preferably, $D_v50$, $D_v90$, and $D_v10$ of the first graphite matrix and the second graphite matrix each satisfy the following condition: $1.0 \leq (D_v90-D_v10)/D_v50 \leq 2.0$, and optionally, $1.0 \leq (D_v90-D_v10)/D_v50 \leq 1.7$. The $(D_v90-D_v10)/D_v50$ of the graphite matrix being controlled within the specific range can make particle size of the graphite matrix relatively concentrated and close, which facilitates improvement of the kinetic performance of the battery.

In any embodiment, preferably, length-diameter ratios $(D_L/D_W)$ of the first graphite matrix and the second graphite matrix each satisfy the following condition: $1.0 \leq D_L/D_w \leq 2.5$, and optionally, $1.4 \leq D_L/D_w \leq 2.4$. The length-diameter ratios of the graphite matrix being controlled within the above specific ranges can make particles of the graphite matrix be closer to a spherical shape, thereby helping perform a self-embedding behavior.

In any embodiment, preferably, the oxygen-containing metal salt is an oxygen-containing lithium metal salt or an oxygen-containing sodium metal salt, and is more preferably selected from at least one of lithium metaaluminate, lithium metazincate, sodium metaaluminate, and sodium metazincate.

In any embodiment, preferably, in step (1), the contact angle between the obtained graphite A and the blank electrolyte is less than or equal to 20°. In step (2), the contact angle between the graphite B and the blank electrolyte is less than or equal to 15°, and the blank electrolyte is formed by dissolving lithium hexafluorophosphate at a concentration of 1 mol/L in a solvent that is formed by mixing ethylene carbonate and dimethyl carbonate at a mass ratio of 1:1.

The negative electrode active material obtained in the preparation method of the second aspect of this application is self-embedded graphite composed of the graphite A and the graphite B, the tenon structure of the graphite A and the mortise structure of the graphite B are mutually embedded, and a hydrogen bond is formed between the tenon structure of the graphite A and the mortise structure of the graphite B.

Preferably, a contact angle between the self-embedded graphite obtained in the preparation method and the blank electrolyte is less than or equal to 15°. The blank electrolyte is formed by dissolving lithium hexafluorophosphate at the concentration of 1 mol/L in the solvent that is formed by mixing ethylene carbonate and dimethyl carbonate at the mass ratio of 1:1.

A third aspect of this application provides a negative electrode plate, where the negative electrode plate includes a negative electrode active material layer, and the negative electrode active material layer includes the negative electrode active material or the negative electrode active material obtained in the preparation method.

In any embodiment, preferably, the negative electrode active material layer further includes a binder, and relative to a weight of the negative electrode active material layer, a proportion of the binder is more than 1.3 wt % and less than 2.0 wt %.

A fourth aspect of this application provides a secondary battery, where the secondary battery includes the negative electrode plate of this application.

A fifth aspect of this application provides an electric apparatus, where the electric apparatus includes the secondary battery of this embodiment.

Effects of Disclosure

According to a new-type negative electrode active material of this application, at least the following technical effects can be obtained.

(1) Self-embedding of graphite particles is implemented, so that the graphite particles are in close contact with each other. Therefore, a high adhesion force can be obtained even via a small amount of binder, which can improve kinetic performance, storage performance, and cycling performance of the battery.

(2) Through a metal coating layer and alkali etching, the surface infiltration of the self-embedded graphite can be improved (for example, by increasing hydroxyl abundance (a hydrophilic polar group) on the surface of the graphite), thereby facilitating slurry dispersion and electrolyte infiltration retention.

(3) The self-embedded graphite particles present a specific sphere-like morphology, which facilitates uniform nucleation of the coating layer and synchronization of alkali etching, so that a secondary battery having more excellent kinetic performance, storage performance, and cycling performance can be obtained.

The foregoing description is merely an overview of the technical solutions of this application. For a better understanding of the technical means in this application such that they can be implemented according to the content of the specification, and to make the above and other objectives, features, and advantages of this application more obvious and easier to understand, the following describes specific embodiments of this application.

BRIEF DESCRIPTION OF DRAWINGS

A person of ordinary skill in the art can clearly understand various other advantages and benefits by reading the detailed description of the preferred embodiments below. The accompanying drawings are merely intended to illustrate the preferred embodiments and are not intended to limit this application. In the accompanying drawings.

DESCRIPTION OF EMBODIMENTS

Figure 1:
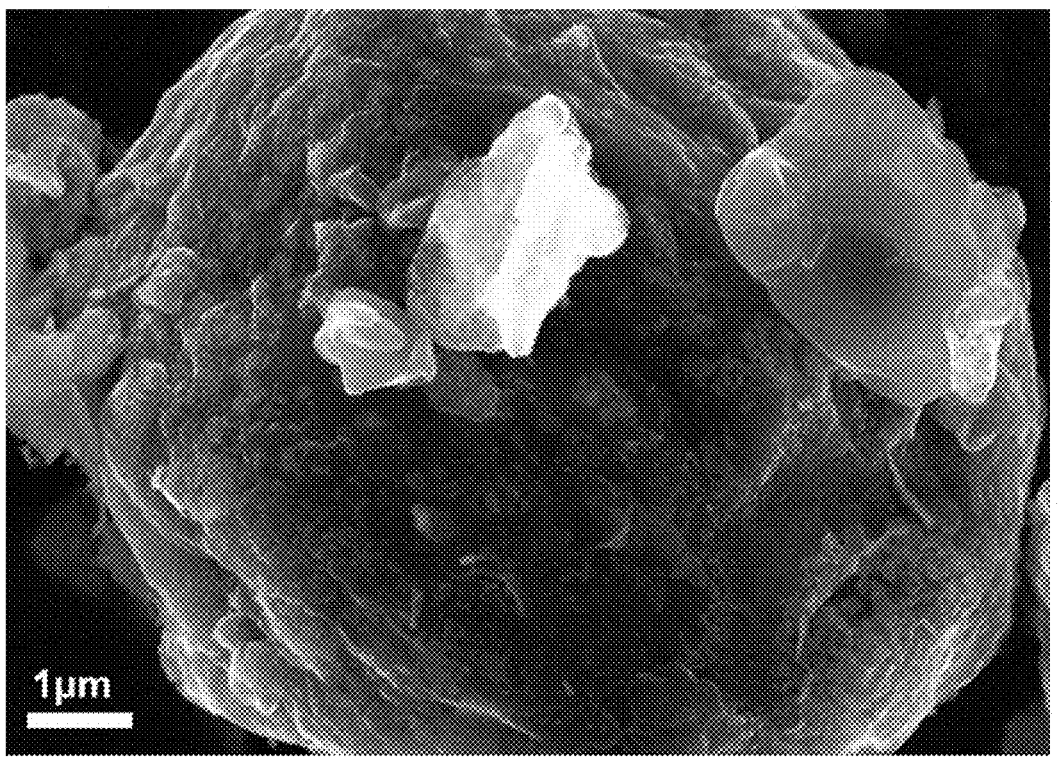
FIG. 1 is a scanning electron microscope (SEM) image of the graphite A in Example 2 of this application.

The following describes in detail a negative electrode active material, a preparation method thereof, a negative electrode plate containing the negative electrode active material, a secondary battery containing the negative electrode plate, and an electric apparatus containing the secondary battery according to the present disclosure.

For simplicity, only some numerical ranges are exemplarily disclosed in this specification. However, any lower limit may be combined with any other upper limit to form a range not expressly recorded; any lower limit may be combined with any other lower limit to form a range not expressly recorded; and any upper limit may be combined with any other upper limit to form a range not expressly recorded. In addition, although not explicitly recorded, each point or individual value between end points of a range is included in the range. Therefore, each point or individual value may be used as its own lower limit or upper limit to be combined with any other point or individual value or combined with any other lower limit or upper limit to form a range not expressly recorded. It should be understood that the enumeration of numerical values is merely an example and should not be interpreted as exhaustive.

In the descriptions of this specification, it should be noted that, unless otherwise stated, "more than", "less than", "≤", and "≥" are all inclusive of the present number, "at least one" means including one or more, and "more" in "one or more" means two or more than two.

Unless otherwise specified, "include" and "contain" mentioned in this application are inclusive or may be exclusive. For example, the terms "include" and "contain" can mean that other unlisted components may also be included or contained, or only listed components are included or contained.

In the preparation process of a negative electrode plate of an existing secondary battery, a binder is generally used, but as a use amount of the binder increases, resistance of the negative electrode plate increases, resulting in deterioration of kinetic performance, storage performance, and the like of the battery.

As a method for reducing the use amount of the binder, a negative electrode material having a core-shell structure is reported, to be specific, a roughened amorphous carbon layer (shell) is coating on the surface of graphite (core), and the roughened amorphous carbon layer has a rough surface that is obtained through machining. The negative electrode active material has a roughened surface, which allows adhesion force to be improved using small amount of binder through an anchoring effect, where the anchoring effect herein means that a curved surface of active material particles in contact with each other is anchored.

However, the inventors have discovered in research that storage performance of a battery using the negative electrode active material is poor, which is because when the amorphous carbon layer is formed, coating uniformity of conventional carbon is poor, and the graphite is damaged by a secondary cutting roughening treatment during machining, thereby causing material consumption. In addition, cycling performance of the battery that is obtained by using the negative electrode active material is poor, which is because when the negative electrode active material is prepared, machining is required to roughen the surface of the material, damaging the coating layer and causing strength and integrity of the coating layer to decrease, while the graphite experiences a volume change during cycling, and stress generated in such volume change may cause an incomplete coating layer and a SEI film that is attached to the incomplete coating layer to be more likely to break, so that a graphite matrix directly reacts with an electrolyte, resulting in deterioration of the cycling performance. In addition, for the battery using the negative electrode active material, kinetic performance can also be further improved.

Therefore, it is necessary to develop a new-type negative electrode active material, which can implement excellent adhesion force without using excessive binders, thereby improving the kinetic performance, storage performance, and cycling performance of the battery.

Negative Electrode Active Material

To resolve the foregoing problems, a first aspect of this application provides a negative electrode active material, where the negative electrode active material is self-embedded graphite composed of graphite A and graphite B; the surface of the graphite A has a tenon structure, and the surface of the graphite B has a mortise structure; and the tenon structure of the graphite A and the mortise structure of the graphite B are mutually embedded, and a hydrogen bond is formed between the tenon structure of the graphite A and the mortise structure of the graphite B.

When the graphite A and the graphite B are mixed, accurate anchoring and self-embedding of the graphite A and the graphite B are implemented through a mortise-tenon connection and the hydrogen bond on the surface, so that a stable self-embedding structure is formed. In this way, according to the negative electrode active material of this application, a secondary cutting does not need to be performed on the surface of the graphite, so that accurate anchoring between graphite particles can be achieved through the mortise-tenon connection and the hydrogen bond without deteriorating storage performance. In this way, excellent adhesion force can be obtained without excessive binder, and performance of a battery is improved.

In an embodiment of this application, a graphite matrix is coated with an oxygen-containing metal salt to form the graphite A, the coating layer formed by coating is not a layer having an even thickness, but a protrusion, which is equivalent to that a tenon structure is formed on the surface of the graphite A. The oxygen-containing metal salt is an oxygen-containing lithium metal salt or an oxygen-containing sodium metal salt, and preferably is selected from at least one of lithium metaaluminate, lithium metazincate, sodium metaaluminate, and sodium metazincate. In addition, a contact angle between the graphite A and a blank electrolyte is preferably less than or equal to 20°, and more preferably less than or equal to 17°.

The surface of the mortise structure of the graphite B has a hydroxyl group, and a contact angle between the graphite B and the blank electrolyte is less than or equal to 15°. A graphite matrix undergoes alkali etching and the like to obtain the graphite B.

In this specification, the blank electrolyte is an electrolyte formed by dissolving lithium hexafluorophosphate at a concentration of 1 mol/L in a solvent that is formed by mixing ethylene carbonate and dimethyl carbonate at a mass ratio of 1:1.

Specifically, the coating layer of the graphite A is of a weak acid structure, where the structure has a hydroxyl group, for example, an actual structure of lithium metaaluminate ($LiAlO_2$) in water is $LiAl(OH)_4$, and the graphite B undergoing alkali etching can bond a hydroxyl functional group on the surface. The graphite A is mixed with the graphite B, and through fully stirring and dispersion during slurry production, the graphite A coated with the oxygen-containing metal salt mainly provides oxygen (due to presence of metal ions, oxygen is more electropositive), and the alkali-etched graphite B mainly provides hydroxyl hydrogen (due to presence of oxygen, hydrogen is more electronegative). Therefore, a hydrogen bond is easily formed between the graphite A coated with the oxygen-containing metal salt and the alkali-etched graphite B.

In addition, a contact angle is an important scale reflecting an infiltration relationship between substance and liquid. According to this application, contact angles between the graphite A and the blank electrolyte and between the graphite B and the blank electrolyte are controlled within the specific ranges, ensuring high hydroxyl abundance (that is, the contact angle can reflect the hydroxyl abundance of the graphite), so that electrolyte infiltration is more easily implemented, and an intermolecular hydrogen bond is easily formed.

For the graphite matrices constituting the graphite A and the graphite B (hereinafter, the graphite matrix constituting the graphite A is referred to as a first graphite matrix, and the graphite matrix constituting the graphite B is referred to as a second graphite matrix), which may be the same or different artificial graphite. For the first graphite matrix and the second graphite matrix, preferably, $D_v50$ satisfies the following condition: 3.0 μm≤$D_v50$≤15.0 μm, and more preferably 5.0 μm≤$D_v50$≤13.5 μm. In addition, preferably, $D_v50$, $D_v90$, and $D_v10$ satisfy the following condition: 1.0≤$(D_v90−D_v50)/D_v50$≤2.0, and more preferably 1.0≤$(D_v90−D_v50)/D_v50$≤1.7. In addition, preferably, length-diameter ratios $D_L/D_W$ each satisfy the following condition: $1.0 \leq D_L/D_w \leq 2.5$, and more preferably $1.4 \leq D_L/D_w \leq 2.4$.

$D_v50$ is a corresponding particle size when a cumulative volume percentage of graphite matrix particles reaches 50%. $D_v90$ is a corresponding particle size when a cumulative volume percentage of graphite matrix particles reaches 90%, $D_v10$ is a corresponding particle size when a cumulative volume percentage of graphite matrix particles reaches 10%, and $(D_v90-D_v10)/D_v50$ indicates a particle size distribution width of the graphite matrix. $D_L$ indicates length of the longest diameter inside particles of the graphite matrix, $D_w$ indicates length of the longest diameter inside particles of the graphite matrix in a direction perpendicular to the longest diameter, and $D_L/D_w$ represents length-diameter ratios of the graphite matrix particles.

The negative electrode active material of this application implements self-embedding of the graphite by using a hydrogen bond and a mortise-tenon connection between an oxygen-containing functional group of a metal coating layer of the graphite A and a hydroxyl group in the mortise structure of the graphite B, thereby reducing use amount of the binder. This application avoids using amorphous carbon as a coating layer (although the amorphous carbon being used as a coating layer can enhance kinetic performance, storage performance of a battery is deteriorated), and improves the kinetic performance of the battery through the tenon structure and the mortise structure formed by the metal salt coating layer without performing secondary cutting on the surface thereof.

In addition, coating of the oxygen-containing lithium metal salt or the oxygen-containing sodium metal salt and forming a recession (mortise structure) on the surface can provide a fast ion channel facilitating rapid deintercalation of lithium ions, which can effectively improve kinetics. In addition, the tenon structure of the graphite A is preferably formed by an oxygen-containing lithium metal salt. In this way, in this application the tenon structure contains lithium ions so as to compensate for consumption of film-forming lithium ions and reduce side reactions while use of amorphous carbon is avoided, thereby helping improve first-cycle coulombic efficiency and the storage performance.

In an embodiment of this application, a contact angle between the self-embedded graphite as the negative electrode active material and the blank electrolyte is less than or equal to 15°. The contact angle between the self-embedded graphite and the blank electrolyte being controlled within the specific range can improve surface infiltration of the graphite and facilitate slurry dispersion and electrolyte infiltration retention.

Preparation Method of Negative Electrode Active Material

A second aspect of this application provides a preparation method of negative electrode active material, including the following steps.

Step (1): Add a first graphite matrix into a polar solvent, then add a raw material for preparing the oxygen-containing metal salt by making an amount of the oxygen-containing metal salt coating the surface of the first graphite matrix be 1-5 wt % of the weight of the first graphite matrix, followed by stirring, evaporation and drying, and then calcine the resulting mixture in a nitrogen atmosphere at a temperature of 500-1200° C., preferably 600-1000° C., and more preferably 700-900° C. for 8-24 hours (preferably 10-20 hours, and more preferably 12 hours) to obtain graphite A having a tenon structure.

In this step, the first graphite matrix may be artificial graphite. The polar solvent used is not particularly limited, for example, a polar solvent commonly used in the art such as deionized water, methanol, ethanol, isopropanol, or water.

The raw material for preparing the oxygen-containing metal salt includes:

(1) any one of lithium nitrate, sodium nitrate, and potassium nitrate; and (2) at least one of aluminum nitrate, zinc nitrate, and ferric nitrate.

In this step, an amount of the raw material used for preparing the oxygen-containing metal salt is preferably 2-12 wt % of the weight of the first graphite matrix, and more preferably 4-8 wt %.

The oxygen-containing metal salt may be an oxygen-containing lithium metal salt or an oxygen-containing sodium metal salt, and is preferably selected from at least one of lithium metaaluminate, lithium metazincate, sodium metaaluminate, and sodium metazincate.

During preparation, preferably, a small amount of the raw material of the oxygen-containing metal salt is first added to allow the small amount of the oxygen-containing metal salt to be first nucleated on the graphite matrix to form a dotted coating layer, and then remaining raw materials are gradually added, so that the subsequently added raw materials preferentially adhere and grow on a nucleated coating dot, thereby forming a more uniform convex structure.

Preferably, in step (1), a contact angle between the obtained graphite A and a blank electrolyte is less than or equal to 20°.

Step (2): Add a second graphite matrix into an alkaline solution having a pH greater than or equal to 13, stir at a constant temperature of 60-100° C. for 8-36 hours (preferably 12-24 hours), preferably 70-90° C., and more preferably 80° C., and after filtering, clean and dry the resulting product to obtain graphite B having a mortise structure.

In this step, the second graphite matrix may be artificial graphite. In this step, the alkaline solution is not particularly limited, provided that its pH is greater than or equal to 13, for example, a sodium hydroxide solution, a potassium hydroxide solution, or the like may be used.

Preferably, in step (2), the contact angle between the obtained graphite B and the blank electrolyte is less than or equal to 15°.

Step (3): Mix the graphite A and the graphite B to obtain a negative electrode active material.

In this step, a mixing method is not particularly limited, which may be a method commonly used in the art, for example, a stirrer may be used for stirring.

In an embodiment of this application, preferably, the first graphite matrix and the second graphite matrix are the same or different artificial graphite.

In a case that the first graphite matrix and the second graphite matrix in this application are artificial graphite, the artificial graphite may be commercially available or prepared by using the following method.

(a) Pulverizing of Raw Material

A coke raw material includes one or more of petroleum-based non-needle coke and petroleum-based needle coke. Optionally, the coke raw material includes petroleum green coke. The raw material is pulverized by using mechanical milling, or roller milling, where a feeding frequency may be 10 Hz-40 Hz, and preferably 25 Hz-35 Hz; and a pulverizing frequency may be 20 Hz-50 Hz, and preferably 35 Hz-45 Hz. After the foregoing treatment, a pulverized aggregate is obtained.

(b) Shaping and Removing of Powder

The material obtained in (a) is placed in a shaping machine to be shaped and powder is removed, where a classification frequency may be 30 Hz-60 Hz, and preferably 40 Hz-50 Hz; and an induced drafting frequency may be 30 Hz-55 Hz, and preferably 35 Hz-45 Hz. After the foregoing treatment, a shaped aggregate is obtained.

(c) Heat Treatment

The material obtained in (b) is placed in a horizontal or vertical reactor, heated to 300-700° C., and preferably heated to 400-550° C. and maintained at a constant temperature for a period of time, where stepwise heating is used. A plurality (for example, 2 to 4) of programmed heating platforms are set in the heating process, so that the resulting product can obtain the desired particle size distribution.

(d) Graphitization

High-temperature graphitization may be performed by using a device known in the art, for example, a graphitization furnace, and an Acheson graphitization furnace. Graphitization temperature is 2500° C.-3500° C.

In the foregoing preparation process, the pulverizing frequency being set to 20 Hz-50 Hz can implement control of $D_v50$, the classification frequency being set to 30 Hz-60 Hz can implement control of $(D_v90-D_v10)/D_v50$, and the feeding frequency being set to 10 Hz-40 Hz and the induced drafting frequency being set to 30 Hz-55 Hz implement control of $D_L/D_W$.

The artificial graphite used as the graphite matrix satisfies the following condition: $D_v50$ satisfies the following condition: $3.0 \ \mu m \leq D_v50 \leq 15.0 \ \mu m$, and preferably $5.0 \ \mu m \leq D_v50 \leq 13.5 \ \mu m$. In addition, preferably, $D_v50$, $D_v90$, and $D_v10$ satisfy the following conditions $1.0 \leq (D_v90-D_v10)/D_v50 \leq 2.0$, and more preferably $1.0 \leq (D_v90-D_v10)/D_v50 \leq 1.7$. In addition, preferably, $D_L$ and $D_W$ satisfy the following condition: $1.0 \leq D_L/D_W \leq 2.5$, and more preferably $1.4 \leq D_L/D_W \leq 2.4$.

The negative electrode active material obtained in the preparation method is self-embedded graphite composed of the graphite A and the graphite B, the tenon structure of the graphite A and the mortise structure of the graphite B are mutually embedded, and a hydrogen bond is formed between the tenon structure of the graphite A and the mortise structure of the graphite B. Preferably, a contact angle between the self-embedded graphite obtained in the preparation method and the blank electrolyte is less than or equal to 15°.

Negative Electrode Plate

A third aspect of this application provides a negative electrode plate, including a negative electrode active material layer, and the negative electrode active material layer includes the negative electrode active material in the first aspect of this application or the negative electrode active material obtained by using the preparation method in the second aspect of this application.

The negative electrode plate includes a negative electrode current collector and a negative electrode active material layer disposed on at least one surface of the negative electrode current collector, and the negative electrode active material layer includes a negative electrode active material.

In some embodiments, the negative electrode current collector may be a metal foil or a composite current collector. For example, the metal foil may be a copper foil. The composite current collector may include a polymer material matrix and a metal layer formed on at least one surface of the polymer material matrix. The composite current collector may be formed by forming a metal material (copper, copper alloy, nickel, nickel alloy, titanium, titanium alloy, silver, silver alloy, or the like) on a polymer material matrix (for example, matrices of polypropylene (PP), polyethylene terephthalate (PET), polybutylene terephthalate (PBT), polystyrene (PS), and polyethylene (PE)).

In some embodiments, the negative electrode active material layer may further optionally include a binder. The binder is not particularly limited, and may be selected from at least one of styrene-butadiene rubber (SBR), polyacrylic acid (PAA), polyacrylic acid sodium (PAAS), polyacrylamide (PAM), polyvinyl alcohol (PVA), sodium alginate (SA), polymethacrylic acid (PMAA), and carboxymethyl chitosan (CMCS). A proportion of the binder is not particularly limited. However, according to this application, the use amount of the binder can be greatly reduced, and relative to the weight of the negative electrode active material layer, the proportion of the binder can be reduced to less than 2.0 wt %, and even if the proportion of the binder is as low as 1.3 wt %, excellent adhesion force can still be obtained.

In some embodiments, the negative electrode active material layer may further optionally include a conductive agent. The conductive agent may be selected from at least one of superconducting carbon, acetylene black, carbon black, Ketjen black, carbon dots, carbon nanotubes, graphene, and carbon nanofiber.

In some embodiments, the negative electrode active material layer may further optionally include other promoters such as a thickener (for example, sodium carboxymethyl cellulose (CMC-Na)).

In some embodiments, the negative electrode plate may be prepared in the following manner: the constituents used for preparing the negative electrode plate, for example, the negative electrode active material, the conductive agent, the binder, and any other constituent, are dispersed in a solvent (for example, deionized water) to form a negative electrode slurry; and the negative electrode slurry is applied onto the negative electrode current collector, followed by processes such as drying and cold pressing to obtain the negative electrode plate.

Secondary Battery

A fourth aspect of this application provides a secondary battery, including a positive electrode plate, a negative electrode plate, an electrolyte, and a separator, and the negative electrode plate is the negative electrode plate described above of this application.

In the secondary battery of this application, the positive electrode plate is not specifically limited and can be selected according to actual needs, and the positive electrode plate may include a conductive agent, a binder, a positive electrode active material, and the like. Types of the conductive agent, the binder and the positive electrode active material are not specifically limited, which can be appropriately selected.

For example, the positive electrode active material may include at least one of the following materials: olivine-structured lithium-containing phosphate, lithium transition metal oxide, and respective modified compounds thereof. However, this application is not limited to such materials, and may alternatively use other conventional well-known materials that can be used as positive electrode active materials for batteries. One of these positive electrode active materials may be used alone, or two or more of them may be used in combination. An example of the lithium transition metal oxide may include but is not limited to at least one of lithium cobalt oxide (for example, $LiCoO_2$), lithium nickel oxide (for example, $LiNiO_2$), lithium manganese oxide (for example, $LiMnO_2$ and $LiMn_2O_4$), lithium nickel cobalt oxide, lithium manganese cobalt oxide, lithium nickel manganese oxide, lithium nickel cobalt manganese oxide (for example, $LiNi_{1/3}CO_{1/3}Mn_{1/3}O_2$ ($NCM_{333}$ for short), $LiNi_{0.5}Co_{0.2}Mn_{0.3}O_2$ (NCM$_{523}$ for short), $LiNi_{0.5}Co_{0.25}Mn_{0.25}O_2$ (NCM$_{211}$ for short), $LiNi_{0.6}Co_{0.2}Mn_{0.2}O_2$ (NCM$_{622}$ for short), $LiNi_{0.8}Co_{0.1}Mn_{0.1}O_2$ (NCM$_{811}$ for short), lithium nickel cobalt aluminum oxide (for example, $LiNi_{0.85}Co_{0.15}Al_{0.05}O_2$), and modified compounds thereof. An example of the olivine-structured lithium-containing phosphate may include but is not limited to at least one of lithium iron phosphate (for example, $LiFePO_4$ (LFP for short)), a composite material of lithium iron phosphate and carbon, lithium manganese phosphate (for example, $LiMnPO_4$), a composite material of lithium manganese phosphate and carbon, lithium manganese iron phosphate, and a composite material of lithium manganese iron phosphate and carbon.

In the secondary battery of this application, the electrolyte conducts ions between the positive electrode plate and the negative electrode plate. The electrolyte is not limited to any specific type in this application, and may be selected as required. For example, the electrolyte may be in a liquid state, a gel state, or an all-solid state.

In some embodiments, the electrolyte is a liquid electrolyte. The liquid electrolyte includes an electrolytic salt and a solvent. The electrolytic salt may be selected from at least one of lithium hexafluorophosphate, lithium tetrafluoroborate, lithium perchlorate, lithium hexafluoroborate, lithium bis(fluorosulfonyl)imide, lithium bis(trifluoromethanesulphonyl)imide), lithium trifluoromethanesulfonate, lithium difluorophosphate, lithium difluorooxalatoborate, lithium bisoxalatoborate, lithium difluorobisoxalate phosphate, and lithium tetrafluoro oxalate phosphate. In addition, the liquid electrolyte may further include an additive as required.

In the secondary battery of this application, the separator is sandwiched between the positive electrode and the negative electrode for separation. The separator is not limited to any specific type in this application and may be any separator material used in secondary batteries, for example, at least one of polyethylene, polypropylene, and polyvinylidene fluoride. The separator may be a single-layer film or a multi-layer composite film, and is not particularly limited.

Electric Apparatus

An electric apparatus in a fifth aspect of the present disclosure includes the secondary battery in the fourth aspect of the present disclosure.

In the electric apparatus of the present disclosure, the secondary battery of the present disclosure may be used as a power source of the electric apparatus or an energy storage unit of the electric apparatus. The electric apparatus may include a mobile device (for example, a mobile phone or a notebook computer), an electric vehicle (for example, a battery electric vehicle, a hybrid electric vehicle, a plug-in hybrid electric vehicle, an electric bicycle, an electric scooter, an electric golf vehicle, or an electric truck), an electric train, a ship, a satellite system, an energy storage system, or the like, but is not limited thereto.

EXAMPLES

The following describes examples of this application. The examples described below are illustrative and only used to explain this application, and cannot be construed as limitations on this application. Examples whose technical solutions or conditions are not specified are made in accordance with technical solutions or conditions described in literature in the field, or made in accordance with product instructions.

The reagents or instruments used are all conventional products that are commercially available if no manufacturer is indicated.

$D_v50$ and $(D_v90–D_v10)/D_v50$ of Graphite Matrix

According to the standard GB/T 19077.1-2016, a laser particle size analyzer (for example, Malven Master Size 3000) is used for measurement.

Length-Diameter Ratios ($D_L/D_W$) of Graphite Matrix

A particle morphology is tested using a scanning electron microscope (ZEISS Sigma 300). The test is performed in accordance with JY/T010-1996. To ensure accuracy of test results, a plurality of (for example, 5) different regions of a sample under test may be randomly selected for scanning and testing, and length-diameter ratios of each region are calculated at a magnification of 3000 times. To ensure accuracy of the test results, a plurality of (for example, 10) test samples can be taken to repeat the foregoing test, and an average value of the test samples is taken as a final test result.

Contact Angle Between Graphite Matrix and Blank Electrolyte

Test sample: 45 mg of graphite is pressed into a 1 cm diameter pressed sample at a pressure of 20 MPa for 30 seconds and left there resting for 5 minutes, and then a contact angle test is performed on the pressed sample.

Test solvent: a blank electrolyte (composed of lithium hexafluorophosphate dissolved at a concentration of 1 mol/L in a solvent that is formed by mixing ethylene carbonate and dimethyl carbonate at a mass ratio of 1:1).

Test steps: the blank electrolyte is dropped by 20 μL using a 100 μL TOP Pette pipette into a test sample, and then according to a contour image analysis method, Data physics Oca40 is used to measure an included angle between a tangent line of a droplet outer surface of the blank electrolyte and a test sample plane as a contact angle.

Example 1

(1) Preparation of Graphite Matrix

Petroleum green coke was pulverized using a mechanical milling with a feeding frequency of 40 Hz and a pulverizing frequency of 40 Hz, and the pulverized material was placed in a shaping machine to be shaped and fine powder was removed with a classification frequency of 50 Hz and an induced drafting frequency of 45 Hz, so as to obtain a shaped aggregate. Then the shaped aggregate was placed in a horizontal reactor, heated to 500° C. and maintained at a constant temperature for 8 hours, where stepwise heating was used, and two programmed heating platform were provided during the heating process. Then, a graphitization furnace was used for high-temperature graphitization, and the graphitization temperature was 3000° C.

$D_v50$, $(D_v90–D_v10)/D_v50$, and length-diameter ratios ($D_L/D_W$) of the obtained graphite matrix were determined using the above method. The results are shown in Table 1.

(2) Preparation of Self-Embedded Graphite

The graphite matrix obtained in (1) was used as a first graphite matrix and a second graphite matrix.

300 g of the first graphite matrix was gradually added into 1000 ml of deionized water, then 7.72 sodium nitrate and 34.10 g of aluminum nitrate nonahydrate were added to make an amount of sodium metaaluminate coating on the surface of the graphite matrix be 2% of the weight of the graphite matrix, followed by stirring and evaporation, and then the resulting product was dried at 120° C. in vacuum for 8 hours, and calcined in a nitrogen atmosphere at a temperature of 800° C. for 12 hours at a heating rate of 10° C./min to obtain dried powder, which was used as graphite A.

In addition, 1000 ml of a potassium hydroxide solution having a pH value of 14.78 at a concentration of 20% was prepared as an etching agent, then 300 g of the second graphite matrix was gradually added, then constant-temperature magnetic stirring was performed in an 80° C. water bath pot for 24 hours, and when the resulting solution was left there resting for 2 hours before vacuum suction filtration was performed to remove supernatant. After that, the resulting product was washed three times by using deionized water, and dried for 8 hours under vacuum at 120° C. to obtain dried powder, which was used as graphite B.

The graphite A and the graphite B obtained above were fully mixed, and self-embedding was performed through hydrogen bonding force on the surface of the graphite and surface-engagement roughness, so as to obtain self-embedded graphite. A contact angle between the self-embedded graphite and the blank electrolyte is shown in Table 1.

In addition, to prove that processing manners in this application have no substantial influence on volume energy density of materials, the inventors have tested gram capacity and first-cycle coulombic efficiency of the first graphite matrix, the second graphite matrix, and the prepared self-embedded graphite. Specific steps were as follows.

The first graphite matrix, a conductive agent Super P, and a binder (PVDF) were mixed to uniformity with a solvent NMP (N-methyl pyrrolidone) at a mass ratio of 91.6:1.8:6.6 to prepare a slurry; the prepared slurry was applied on a copper foil current collector, followed by drying in an oven and cold pressing for later use, where a compaction range was 1.4-1.6 g/cm³; a metal lithium plate was used as a counter electrode; a polyethylene (PE) film was used as a separator; ethylene carbonate (EC), methyl ethyl carbonate (EMC), and diethyl carbonate (DEC) were mixed at a volume ratio of 1:1:1, and then $LiPF_6$ was dissolved to uniformity in the solution to obtain a liquid electrolyte, where a concentration of LiPF6 was 1 mol/L; and these parts were assembled into a CR2430 type button battery in a glove box protected by argon. After being left there resting for 12 hours, the obtained button battery was discharged to 0.005 V at a constant current of 0.05C. After being left there resting for 10 minutes, the obtained button battery was discharged to 0.005 V again at a constant current of 50 μA. After being left there resting for 10 minutes, the obtained button battery was discharged to 0.005 V again at a constant current of 10 μA. A sum of the three discharge capacities was a discharge capacity. The obtained button battery was then charged to 2.000 V at a constant current of 0.1C, and a charge capacity was recorded. A ratio of the charge capacity to mass of the first graphite matrix was a gram capacity of the first graphite matrix, and a ratio of the charge capacity to the discharge capacity was the first-cycle coulombic efficiency.

The second graphite matrix, a conductive agent Super P, and a binder (PVDF) were mixed to uniformity with a solvent NMP (N-methylpyrrolidone) at a mass ratio of 91.6:1.8:6.6, and a gram capacity and first-cycle coulombic efficiency of the second graphite matrix were determined using the same method described above.

The self-embedded graphite, a conductive agent Super P, and a binder (PVDF) were mixed to uniformity with a solvent NMP (N-methylpyrrolidone) at a mass ratio of 91.6:1.8:6.6, and a gram capacity and first-cycle coulombic efficiency of the self-embedded graphite were determined using the same method described above.

Specific values of the gram capacity and first-cycle coulombic efficiency determined as described above are shown in Table 1 below.

Example 2

Preparation method was the same as that in Example 1 except that 6.27 g of lithium nitrate and 34.10 g of aluminum nitrate nonahydrate were added to make an amount of lithium metaaluminate coating the surface of the graphite matrix be 2% of the weight of the graphite matrix.

Figure 2:
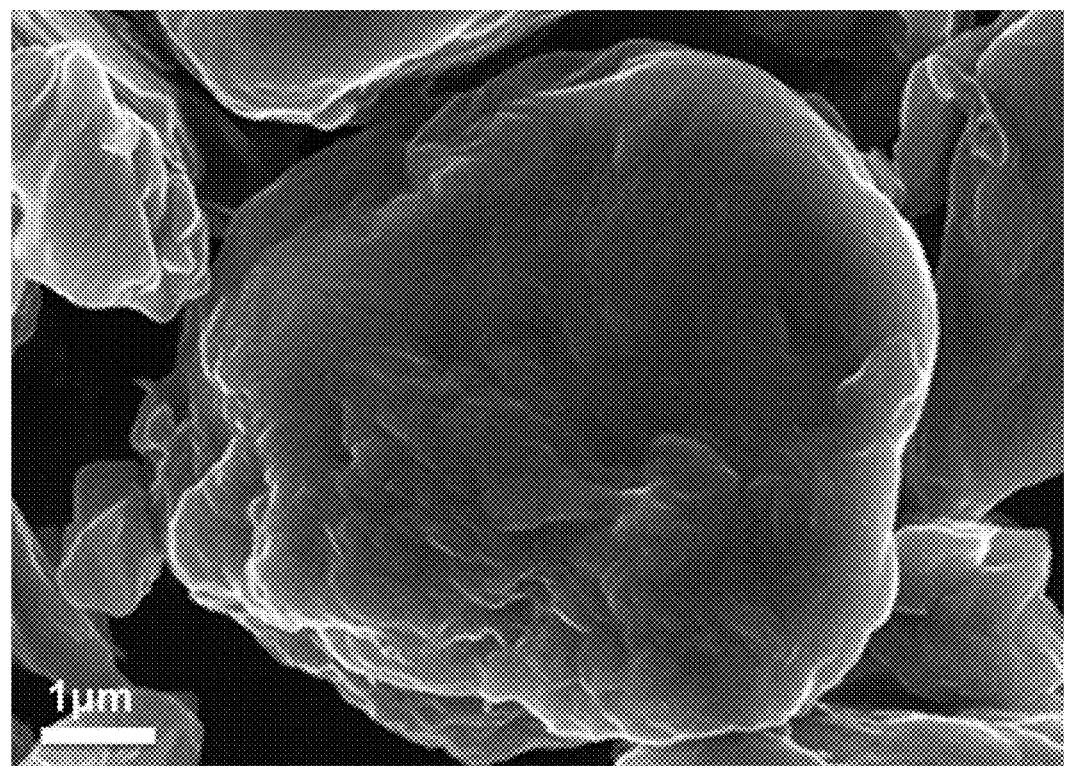
FIG. 2 is a SEM image of the graphite B in Example 2 of this application.
Figure 3:
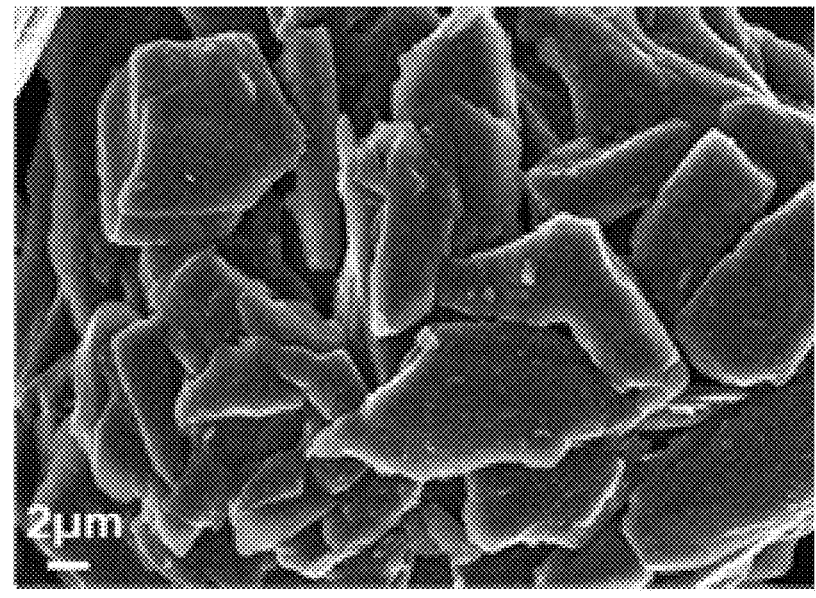
FIG. 3 is a SEM image of the self-embedded graphite in Example 2 of this application.

SEM images of the graphite A, the graphite B, and the self-embedded graphite obtained in Example 2 are respectively shown in FIG. 1, FIG. 2, and FIG. 3. As shown in FIG. 1, a granular protrusion is formed on the surface of the graphite A, which has a tenon structure. As shown in FIG. 2, a recess is formed on the surface of the graphite B, that is, the surface of the obtained graphite B has a mortise structure. As shown in FIG. 3, the graphite A and the graphite B are self-embedded.

Example 3

Preparation method was the same as that in Example 1 except that 15.66 g of lithium nitrate and 85.25 g of aluminum nitrate nonahydrate were added to make an amount of lithium metaaluminate coating the surface of the graphite matrix be 5% of the weight of the graphite matrix.

Example 4

Preparation method was the same as that in Example 2 except that a sodium hydroxide solution having a pH value of 14.96 (with a mass fraction of 30%), as an etchant, was magnetically stirred at a constant temperature in a 90° C. water bath pot for 8 hours.

Examples 5 to 16

(1) Preparation of Graphite Matrix

The graphite matrix was prepared by appropriately adjusting the feeding frequency, the pulverizing frequency, the classification frequency, and the induced drafting frequency. $D_v50$, $(D_v90-D_v10)/D_v50$, and length-diameter ratios $(D_L/D_W)$ of the obtained graphite matrix are shown in Table 1.

(2) Preparation of Self-Embedded Graphite

Preparation method was the same as that in Example 2 except that the graphite matrix shown in Table 1 was used accordingly.

The contact angles between the graphite A and the blank electrolyte and between the graphite B and the blank electrolyte, the contact angle between the self-embedded graphite and the blank electrolyte, the gram capacity, and the first-cycle coulombic efficiency, which are obtained in Examples 1-16, are all shown in Table 1.

Comparative Example 1

Preparation method was the same as that in Example 1 except that 18.81 g of lithium nitrate and 102.3 g of aluminum nitrate nonahydrate were added to make an amount of lithium metaaluminate coating the surface of the graphite matrix be 6 wt % of the weight of the graphite matrix. Due to an excessive amount of the coating lithium metaaluminate, a protrusion formed on the surface of the graphite A did not match a recess of the graphite B, thus the self-embedded graphite of the present disclosure failed to be formed.

Comparative Example 2

Preparation method was the same as that in Example 1 except that a sodium hydroxide solution having a pH value of 12, as an etchant, was magnetically stirred at a constant temperature for 12 hours. Because the surface of the graphite B was not fully recessed, the self-embedded graphite of the present disclosure failed to be formed.

Comparative Example 3

1000 g of the graphite matrix (core) in Example 1 and 100 g of coal tar pitch as an amorphous carbon layer precursor were mixed in a drum mixer for 2 hours, followed by heat treatment at 1150° C. for 600 minutes to obtain graphite coated with an amorphous carbon layer (shell). The graphite coated with the amorphous carbon layer prepared was introduced into a spheroidizing device (device name: AMD3), and spheroidized at a speed of 1,000 rpm for 2 hours using a spheroidizing cutter.

The graphite coated with the spheroidized amorphous carbon layer was introduced into the spheroidizing device with a needle roughening cutter having a diameter of 10 μm replacing a spheroidizing cutter, and processed at a speed of 500 rpm so as to form a first rough surface having a surface roughness of 7 μm. After that, the needle roughening cutter was replaced with a roughening cutter having a diameter of 2 μm, and then the first rough surface was processed at a speed of 200 rpm so as to form a second rough surface having a surface roughness of 3 μm, so that a negative electrode active material having a core-shell structure which includes an amorphous carbon layer having a roughening surface was prepared.

(1) Preparation of Positive Electrode Plate

A positive electrode active material $LiNi_{0.8}Co_{0.1}Mn_{0.1}O_2$, a conductive agent Super P, and a binder polyvinylidene fluoride (PVDF) were added to N-methylpyrrolidone (NMP) to prepare a positive electrode slurry. A percentage by weight of solids in the positive electrode slurry was 50 wt %, and a mass ratio of $LiNi_{0.8}Co_{0.1}Mn_{0.1}O_2$, Super P and PVDF in solid components was 8:1:1. The positive electrode slurry was applied on a current collector aluminum foil which was dried at 85° C. and cold pressed, followed by trimming, cutting, slitting, and drying under a vacuum condition at 85° C. for 4 hours, to prepare a positive electrode plate.

(2) Preparation of Negative Electrode Plate

The negative electrode active material, the binder styrene-butadiene rubber (SBR), the thickening agent sodium carboxymethyl cellulose (CMC-Na), and the conductive agent carbon black (Super P) that were in the examples or comparative examples were added to make a weight ratio thereof be 96.3:1.3:1.2:1.2, and a resulting mixture was mixed to uniformity in deionized water to prepare a negative electrode slurry. The negative electrode slurry was applied on a current collector copper foil which was dried at 85° C. and cold pressed, followed by trimming, cutting, slitting, and drying under a vacuum condition at 120° C. for 12 hours, to prepare a negative electrode plate.

Adhesion force of the prepared negative electrode plate was tested by using a Gotech tensile machine according to a typical 180-degree peeling test. The results are shown in Table 2.

(3) Preparation of Secondary Battery

A polypropylene film (PE) with a thickness of 16 μm was used as a separator. The positive electrode plate, the separator, and the negative electrode plate were sequentially stacked so that the separator was sandwiched between the positive electrode plate and the negative electrode plate for separation. Then the resulting stack was wound to obtain a

TABLE 1

| | Graphite matrix | | | | | | Graphite | Graphite | Self-embedded graphite | | |
| | $D_v50$ (μm) | $(D_v90-D_v10)/D_v50$ | $D_L/D_W$ | Gram capacity (mAh/g) | First-cycle coulombic efficiency | Contact angle (°) | A Contact angle (°) | B Contact angle (°) | Gram capacity (mAh/g) | First-cycle coulombic efficiency | Contact angle (°) |
|---|---|---|---|---|---|---|---|---|---|---|---|
| Example 1 | 9.20 | 1.31 | 1.30 | 353.5 | 93.5% | 25.8 | 14.8 | 7.5 | 352.1 | 92.7% | 12.5 |
| Example 2 | 9.20 | 1.31 | 1.30 | 353.5 | 93.5% | 25.8 | 9.3 | 7.1 | 353.1 | 93.6% | 7.9 |
| Example 3 | 9.20 | 1.31 | 1.30 | 353.5 | 93.5% | 25.8 | 8.1 | 7.2 | 352.3 | 93.8% | 7.3 |
| Example 4 | 9.20 | 1.31 | 1.30 | 353.5 | 93.5% | 25.8 | 9.3 | 6.1 | 352.8 | 93.1% | 7.5 |
| Example 5 | 13.10 | 2.30 | 2.60 | 353.6 | 94.0% | 26.2 | 15.4 | 11.2 | 353.1 | 93.6% | 13.8 |
| Example 6 | 9.70 | 2.10 | 2.79 | 353.2 | 93.5% | 24.1 | 14.6 | 11.1 | 352.9 | 93.4% | 12.7 |
| Example 7 | 8.30 | 2.06 | 2.68 | 352.8 | 93.4% | 24.8 | 13.2 | 9.8 | 352.3 | 93.5% | 11.5 |
| Example 8 | 5.20 | 2.30 | 2.80 | 353.3 | 93.6% | 22.5 | 11.8 | 8.5 | 351.9 | 93.6% | 10.5 |
| Example 9 | 17.60 | 1.70 | 2.73 | 354.5 | 93.8% | 28.4 | 15.7 | 13.4 | 353.3 | 93.6% | 14.3 |
| Example 10 | 17.60 | 1.40 | 2.80 | 354.1 | 93.2% | 28.4 | 15.2 | 12.4 | 352.9 | 93.5% | 13.7 |
| Example 11 | 17.60 | 1.17 | 2.60 | 354.0 | 93.8% | 28.4 | 14.8 | 12.3 | 353.3 | 93.7% | 13.0 |
| Example 12 | 16.70 | 1.05 | 2.60 | 353.9 | 93.7% | 28.4 | 14.2 | 12.5 | 353.2 | 93.5% | 12.8 |
| Example 13 | 18.10 | 2.10 | 2.30 | 354.9 | 93.8% | 29.4 | 15.8 | 14.4 | 353.3 | 93.6% | 14.9 |
| Example 14 | 17.50 | 2.13 | 1.70 | 354.6 | 93.4% | 28.5 | 15.2 | 13.5 | 354.3 | 93.6% | 14.3 |
| Example 15 | 17.20 | 2.20 | 1.40 | 354.2 | 93.3% | 27.8 | 14.7 | 12.8 | 353.8 | 93.6% | 14.0 |
| Example 16 | 18.02 | 2.30 | 2.56 | 355.1 | 93.6% | 28.9 | 16.2 | 13.9 | 353.3 | 93.8% | 15.0 |
| Comparative Example 1 | 9.20 | 1.31 | 1.30 | 353.5 | 93.5% | 25.8 | 7.6 | 7.3 | — | — | — |
| Comparative Example 2 | 9.20 | 1.31 | 1.30 | 353.5 | 93.5% | 25.8 | 9.6 | 25.5 | — | — | — |

Next, the negative electrode active materials obtained in the examples and comparative examples were separately manufactured into a secondary battery for performance testing. The test results are shown in Table 2 below.

bare cell, and a tab was welded. The bare cell was placed into an outer package. Ethylene carbonate (EC), methyl ethyl carbonate (EMC) and diethyl carbonate (DEC) were mixed at a volume ratio of 1:1:1, and a fully dried lithium salt LiPF$_6$ was dissolved to uniformity in the solution to obtain a liquid electrolyte, which was then injected into a dried cell. Processes such as packaging, standing, formation, shaping, and capacity test were performed to obtain a secondary battery.

For the prepared secondary battery, the following performance tests were performed. The specific test results are shown in Table 2.

(a) Fast-Charging Performance of Battery (0-80% SOC)

The secondary batteries prepared in the examples and comparative examples were charged at 25° C. to 4.25 V at a constant current of 1C (that is, a current value at which a theoretical capacity is completely discharged in 1 h), charged to a current of 0.05C at a constant voltage, left there resting for 5 minutes, and then discharged to 2.8 V at a constant current of 1C, and an actual capacity was recorded as C0. Then the batteries were charged to 4.25 V or a negative electrode cut-off potential of 0 V (whichever came first) successively at a constant current of 0.5C0, 1C0, 1.5C0, 2C0, 2.5C0, 3C0, 3.5C0, 4C0 and 4.5C0, and needed to be discharged to 2.8 V at 1C0 after each charge was completed. Corresponding negative potentials for charging to 10%, 20%, 30%, . . . , and 80% SOC (State of Charge, state of charge) at different charging rates were recorded, and charging rate-negative potential curves in different SOC states were drawn, and linear fitting was performed to obtain charging rates corresponding to a negative-electrode potential of 0 V under different SOCs. These charging rates were charging windows for these SOCs, denoted as C20% SOC, C30% SOC, C40% SOC, C50% SOC, C60% SOC, C70% SOC, and C80% SOC. A charging time T (min) for each of the batteries charged from 10% SOC to 80% SOC was calculated according to this formula: (60/C20% SOC+60/C30% SOC+60/C40% SOC+60/C50% SOC+60/C60% SOC+60/C70% SOC+60/C80% SOC)×10%. A shorter time indicates better fast-charging performance of the battery.

(b) Energy Storage Performance Testing for the Battery

At 25° C., secondary batteries prepared in the examples and comparative examples were charged to a charging cut-off voltage 4.25 V at a constant current of 0.33C, charged to a current of 0.05C at a constant voltage, left there resting for 5 minutes, and then discharged to a discharging cut-off voltage of 2.8 V at a constant current of 0.33C. An initial capacity thereof was recorded as C0. Then the batteries were stored at a constant temperature in a 60C environment until a cycling capacity retention rate (Cn/C0× 100%) became 80%, and then the storage days were recorded. More storage days indicate a longer storage life of the battery.

(c) Cycling Performance of Battery (Decayed to 80% of the Initial Reversible Capacity)

At 25° C., secondary batteries prepared in the examples and comparative examples were charged to a charging cut-off voltage 4.25 V at a constant current of 0.33C, charged to a current of 0.05C at a constant voltage, left there resting for 5 minutes, and then discharged to a discharging cut-off voltage of 2.8 V at a constant current of 0.33C. An initial capacity thereof was recorded as C0. Then the batteries were charged at 2C and discharged at 1C. A discharge capacity Cn at each cycle was recorded until a cycling capacity retention rate (Cn/C0×100%) was 80%, and the number of cycles was recorded. More cycles indicate a longer cycle life of the battery.

TABLE 2

| Number | Adhesion force (N) | Battery performance | | |
|---|---|---|---|---|
| | | Fast-charging performance (minutes) | Storage performance (days) | Cycling performance (cycles) |
| Example 1 | 16.5 | 20.2 | 350 | 3380 |
| Example 2 | 16.2 | 18.1 | 375 | 3690 |
| Example 3 | 15.8 | 20.5 | 390 | 3580 |
| Example 4 | 15.5 | 17.4 | 330 | 3200 |
| Example 5 | 15.2 | 22.3 | 365 | 3460 |
| Example 6 | 14.8 | 21.6 | 358 | 3320 |
| Example 7 | 14.2 | 21.1 | 345 | 3300 |
| Example 8 | 14.9 | 20.8 | 336 | 3150 |
| Example 9 | 14.5 | 24.5 | 323 | 3340 |
| Example 10 | 13.6 | 23.9 | 319 | 3280 |
| Example 11 | 12.7 | 23.1 | 301 | 3360 |
| Example 12 | 12.1 | 23.3 | 280 | 3280 |
| Example 13 | 12.4 | 24.9 | 323 | 3320 |
| Example 14 | 12.3 | 24.2 | 335 | 3450 |
| Example 15 | 12.1 | 23.7 | 326 | 3220 |
| Example 16 | 10.5 | 28.9 | 300 | 3110 |
| Comparative Example 1 | 7.7 | 33.2 | 270 | 2700 |
| Comparative Example 2 | 7.3 | 36.1 | 285 | 2900 |
| Comparative Example 3 | 8.1 | 39.1 | 245 | 1600 |

It can be seen from the data in Table 1 that, in Examples 1 to 16, after the graphite matrix is processed to form the self-embedded graphite, the gram capacity and the first-cycle coulombic efficiency of the material are not significantly affected. In addition, the graphite matrix is processed, thus the contact angles between the obtained graphite A and the blank electrolyte and between the obtained graphite B and the blank electrolyte become smaller, so that a hydrogen bond is easily formed between the graphite A and the graphite B.

It can be seen from the data in Table 2 that, in Examples 1 to 16 of this application, an excessively high adhesion force is obtained through an excessively small amount of binder (1.3 wt %), so that the obtained secondary battery has excellent kinetic performance, storage performance, and cycling performance.

As compared with Comparative Examples 1 to 3, in Examples 1 to 16, the graphite A and the graphite B form the self-embedded graphite through the mortise-tenon connection and hydrogen bond, so that the adhesion force of the negative electrode is significantly increased, the fast-charging performance of the battery is excellent, the kinetic performance of the battery is greatly improved, and the storage performance and the cycling performance of the battery are also improved. In Comparative Examples 1 to 3, the self-embedded structure of this application is not formed, so that the technical effects of this application are not obtained.

In addition, as compared with Example 16, in Examples 5 to 8, Examples 9 to 12, and Examples 13 to 15, the values of D$_v$50, (D$_v$90–D$_v$10)/D$_v$50 and D$_L$/D$_W$ of the graphite matrix being made within the specific ranges defined in this application can further improve the adhesion force, thereby further improving the fast-charging performance, and obtaining excellent battery storage performance and cycling performance.

Furthermore, as compared with Examples 5 to 16, in Examples 1 to 4, the values of D$_v$50, (D$_v$90–D$_v$10)/D$_v$50 and D$_L$/D$_W$ of the graphite matrix being made within the specific ranges defined in this application can implement more excellent technical effects.

It should be noted that this application is not limited to the foregoing embodiments. The foregoing embodiments are merely examples, and embodiments having substantially the same constructions and having the same effects as the technical idea within the scope of the technical solutions of this application are all included in the technical scope of this application. In addition, without departing from the essence of this application, various modifications made to the embodiments that can be conceived by persons skilled in the art, and other manners constructed by combining some of the constituent elements in the embodiments are also included in the scope of this application.

The invention claimed is:

1. A negative electrode active material, wherein
the negative electrode active material is self-embedded graphite composed of graphite A and graphite B;
a surface of the graphite A has a tenon structure, and a surface of the graphite B has a mortise structure; and
the tenon structure of the graphite A and the mortise structure of the graphite B are mutually embedded, and a hydrogen bond is formed between the tenon structure of the graphite A and the mortise structure of the graphite B.

2. The negative electrode active material according to claim 1, wherein
the tenon structure of the graphite A is formed by an oxygen-containing metal salt, and a contact angle between the graphite A and a blank electrolyte is less than or equal to 20°; and
the blank electrolyte is formed by dissolving lithium hexafluorophosphate at a concentration of 1 mol/L in a solvent that is formed by mixing ethylene carbonate and dimethyl carbonate at a mass ratio of 1:1.

3. The negative electrode active material according to claim 2, wherein
the surface of the mortise structure of the graphite B has a hydroxyl group, and a contact angle between the graphite B and the blank electrolyte is less than or equal to 15°.

4. The negative electrode active material according to claim 2, wherein
the oxygen-containing metal salt is an oxygen-containing lithium metal salt or an oxygen-containing sodium metal salt, and is selected from at least one of lithium metaaluminate, lithium metazincate, sodium metaaluminate, or sodium metazincate.

5. The negative electrode active material according to claim 1, wherein
a contact angle between the self-embedded graphite and a blank electrolyte is less than or equal to 15°; and
the blank electrolyte is formed by dissolving lithium hexafluorophosphate at the concentration of 1 mol/L in the solvent that is formed by mixing ethylene carbonate and dimethyl carbonate at the mass ratio of 1:1.

6. A preparation method of negative electrode active material, comprising the following steps:
(1) adding a first graphite matrix into a polar solvent, then adding a raw material for preparing an oxygen-containing metal salt to make an amount of the oxygen-containing metal salt coating a surface of the first graphite matrix be 1-5 wt % of a weight of the first graphite matrix, followed by stirring, evaporation, and drying, and then calcining the resulting mixture in a nitrogen atmosphere at a temperature of 500-1200° C. for 8-24 hours to obtain graphite A having a tenon structure;

(2) adding a second graphite matrix into an alkaline solution having a pH greater than or equal to 13, stirring at a constant temperature of 60-100° C. for 8-36 hours, and after filtering, cleaning, and drying the resulting product to obtain graphite B having a mortise structure; and
(3) mixing the graphite A and the graphite B to obtain a negative electrode active material.

7. The preparation method according to claim 6, wherein the first graphite matrix and the second graphite matrix are different from each other.

8. The preparation method according to claim 6, wherein the first graphite matrix and the second graphite matrix are the same or different artificial graphite.

9. The preparation method according to claim 6, wherein the raw material for preparing the oxygen-containing metal salt comprises:
(1) any one of lithium nitrate, sodium nitrate, and potassium nitrate; and
(2) at least one of aluminum nitrate, zinc nitrate, or ferric nitrate.

10. The preparation method according to claim 6, wherein $D_v50$ of the first graphite matrix and the second graphite matrix each satisfy the following condition:

$$3.0 \ \mu m \leq D_v50 \leq 15.0 \ \mu m.$$

11. The preparation method according to claim 6, wherein $D_v50$, $D_v90$, and $D_v10$ of the first graphite matrix and the second graphite matrix each satisfy the following condition:

$$1.0 \leq (D+90-D_v50)/D_v50 \leq 2.0.$$

12. The preparation method according to claim 6, wherein length-diameter ratios $D_L/D_W$ of the first graphite matrix and the second graphite matrix each satisfy the following condition:

$$1.0 \leq D_L/D_w \leq 2.5.$$

13. The preparation method according to claim 6, wherein the oxygen-containing metal salt is an oxygen-containing lithium metal salt or an oxygen-containing sodium metal salt, and is selected from at least one of lithium metaaluminate, lithium metazincate, sodium metaaluminate, or sodium metazincate.

14. The preparation method according to claim 6, wherein
in step (1), the contact angle between the obtained graphite A and a blank electrolyte is less than or equal to 20°;
in step (2), the contact angle between the obtained graphite B and the blank electrolyte is less than or equal to 15°; and
the blank electrolyte is formed by dissolving lithium hexafluorophosphate at a concentration of 1 mol/L in a solvent that is formed by mixing ethylene carbonate and dimethyl carbonate at a mass ratio of 1:1.

15. The preparation method according to claim 6, wherein
the obtained negative electrode active material is self-embedded graphite composed of the graphite A and the graphite B, the tenon structure of the graphite A and the mortise structure of the graphite B are mutually embedded, and a hydrogen bond is formed between the tenon structure of the graphite A and the mortise structure of the graphite B.

16. The preparation method according to claim 15, wherein
a contact angle between the self-embedded graphite and a blank electrolyte is less than or equal to 15°; and the blank electrolyte is formed by dissolving lithium hexafluorophosphate at the concentration of 1 mol/L in the solvent that is formed by mixing ethylene carbonate and dimethyl carbonate at the mass ratio of 1:1.

17. A negative electrode plate, wherein the negative electrode plate comprises a negative electrode active material layer, and the negative electrode active material layer comprises the negative electrode active material according to claim 1.

18. The negative electrode plate according to claim 17, wherein the negative electrode active material layer further comprises a binder, and relative to a weight of the negative electrode active material layer, a proportion of the binder is more than 1.3 wt % and less than 2.0 wt %.

19. A secondary battery, wherein the secondary battery comprises the negative electrode plate according to claim 17.

20. An electric apparatus, wherein the electric apparatus comprises the secondary battery according to claim 19.

* * * * *